April 23, 1963 H. S. RUBENS 3,087,050

INSTRUMENT FOR INSPECTING LOCKS

Filed June 13, 1960 2 Sheets-Sheet 1

INVENTOR.
HARRY S. RUBENS

BY John W. Kovalick, Agent
Karl Huber
James E. Bryan
Alan C. Rose
ATTORNEYS

April 23, 1963 H. S. RUBENS 3,087,050

INSTRUMENT FOR INSPECTING LOCKS

Filed June 13, 1960 2 Sheets-Sheet 2

INVENTOR.
HARRY S. RUBENS

BY John G. Kovalick, Agent
Karl Kuben
James E. Bryan
Alan C. Rose
ATTORNEYS

United States Patent Office 3,087,050
Patented Apr. 23, 1963

3,087,050

INSTRUMENT FOR INSPECTING LOCKS

Harry S. Rubens, Massapequa, N.Y., assignor to Engelhard Hanovia, Inc., Newark, N.J., a corporation of New Jersey Filed June 13, 1960, Ser. No. 35,547
1 Claim. (Cl. 240—6.4)

The present invention deals with an instrument for inspecting locks and more particularly with an instrument for the visual inspection of the interior mechanism of locks.

In the visual inspection of the interior mechanism of assembled locks, it is a normal practice to direct a narrow light beam into the key way recess of the lock while independently applying a slender instrument, e.g. a pick, to move or contact an interior component of the lock mechanism. There are several disadvantages in such inspection method. One disadvantage is that the directed light beam produces a reflection from the face of the lock, which interferes with good vision to the lock interior. Another disadvantage is that extraneous light further interferes with good vision. A further disadvantage is that the independent manipulation of the light source and pick produces shadows which interfere with the lock inspection.

The present invention is concerned with an instrument for the visual inspection of the interior mechanism of locks and which comprises a combination of a light source, funnel means for funneling a light beam and shielding reflected or extraneous light from the user, and a slender elongated pick means mounted on the funnel means and extending forwardly of the funnel means, whereby the light beam is directed and maintained longitudinally of the pick during manipulation of the interior lock mechanism by means of the pick.

It is an object of the invention to provide an instrument for the visual inspection of the interior mechanism of locks, whereby a light beam and a pick means are simultaneously operated and the light beam is maintained in a fixed direction longitudinally of the pick means.

It is another object of the invention to provide an instrument for the visual inspection of the interior mechanism of locks, whereby a light beam is funneled into a lock key way recess and the vision of the user is shielded from reflected and extraneous light.

Figure 1:
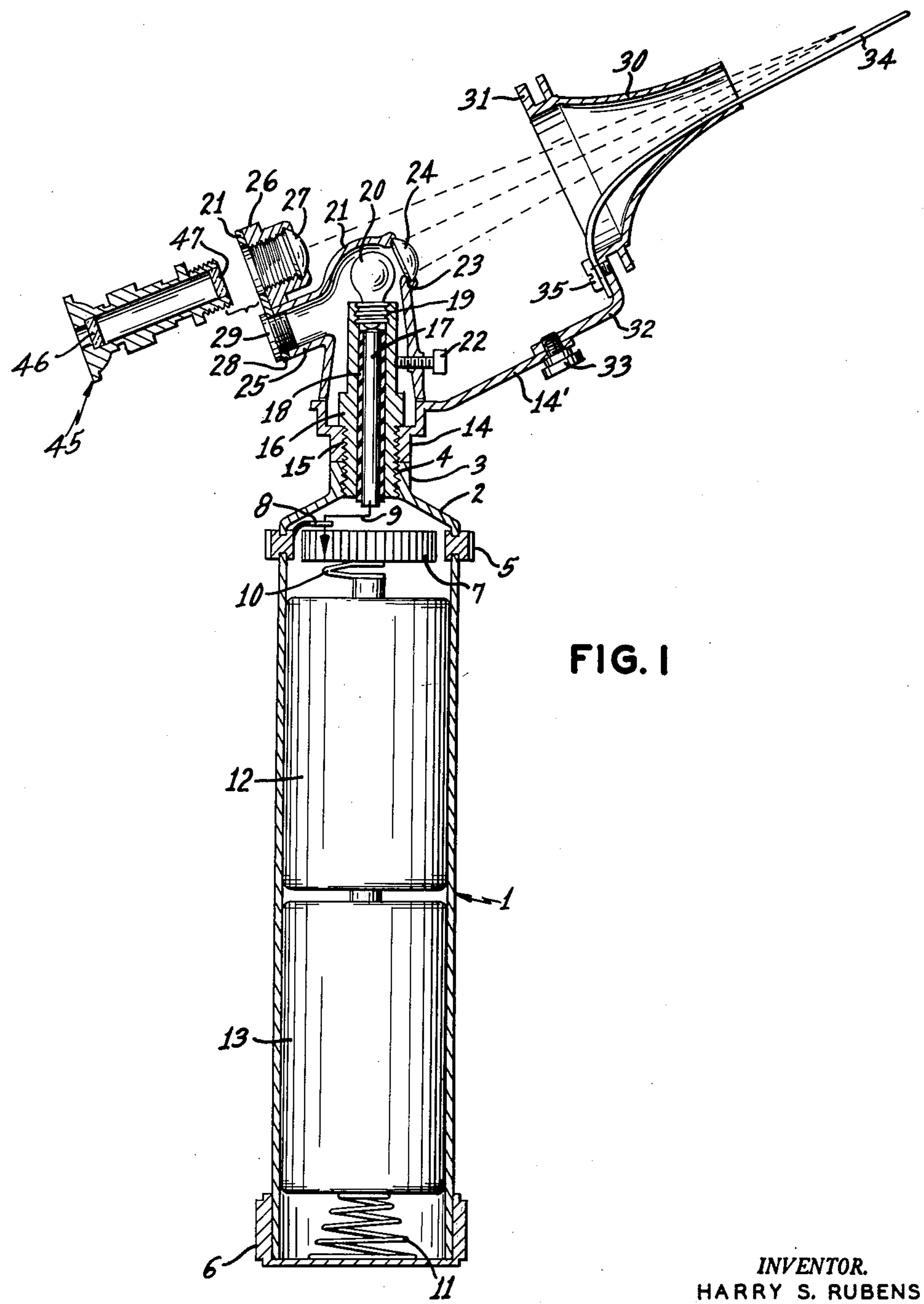
Figure 2:
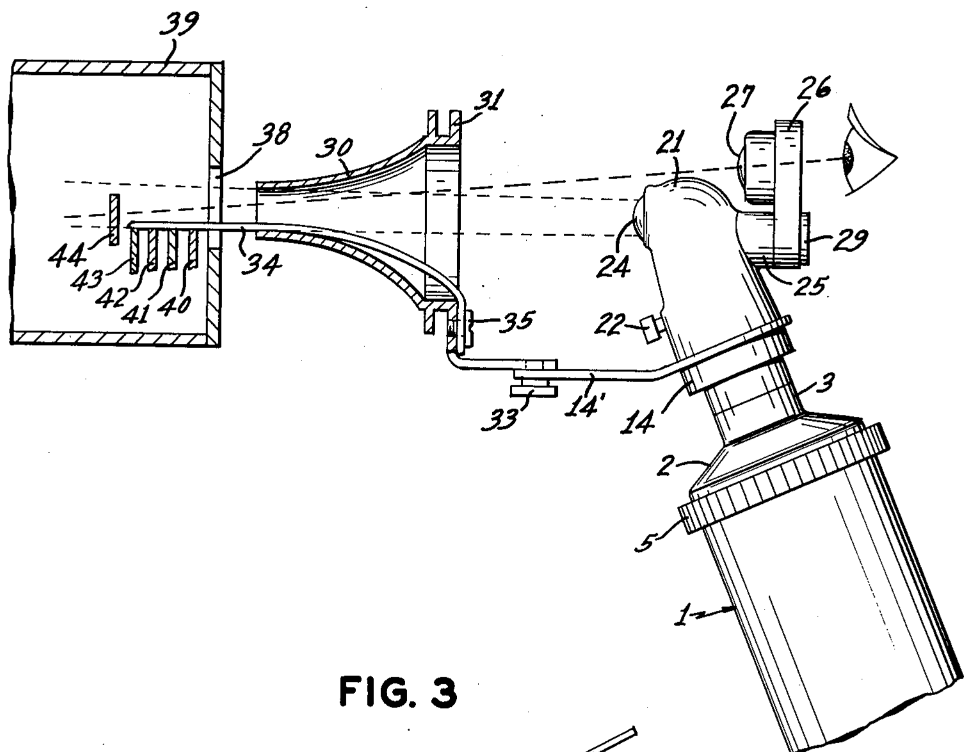
Figure 3:
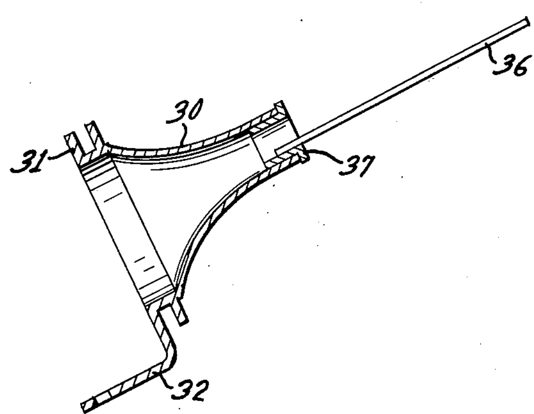

Other objects of the invention will become apparent from the description hereinafter following and the drawings forming a part hereof, in which:

FIGURE 1 illustrates a partly cross-sectional and partly elevational side view of the instrument of the invention, FIGURE 2 illustrates a modified partly schematic and parlty cross-sectional fragmentary side view showing the use of the instrument, and FIGURE 3 illustrates a partly cross-sectional and partly elevational side view of a modified component of the invention.

Regarding FIGURE 1, the instrument of the invention comprises a substantially tubular housing 1 having one end tapered as at 2 with a short tubular neck 3 extending from the tapered portion. The neck 3 is internally threaded as at 4. A rotatable ring 5 is mounted on the exterior of the housing near the tapered end 2 and is coaxial with the housing. A removable closure means 6 is mounted on the other end of the tubular housing. A rheostat 7, schematically illustrated, is suitably mounted in the housing 1 at the approximate location of the ring 5. Linkage means, e.g. arm 8, composed of insulation material or otherwise insulated with respect to the housing, interconnects the ring 5 and a movable contact arm 9 through the housing wall whereby rotary movement of the ring 5 is transmitted to the contact arm 9 which moves the arm over the rheostat winding and varies the electrical resistance between a source of electrical energy and contact arm 9. In lieu of the rheostat 7, any well known variable resistance or potentiometer means may be employed. A conductive spring member 10 is suitably electrically connected to the rheostat winding. Another conductive spring member 11 is mounted on the internal surface of the closure means 6. A source of electrical energy, e.g. in the form of a series of batteries 12 and 13, is mounted in the housing 1 between and in electrical contact with the springs 10 and 11.

A collar 14, having arm 14' extending laterally outwardly thereof, is provided with a threaded internal surface as at 15 and a tubular metal plug member 16 is threadedly mounted in the collar with portions thereof extending above and below the collar. The plug member comprises a conductive rod core 17 insulated from the internal surface of the tubular plug by means of insulating sleeve 18. The upper portion of the tubular plug is internally threaded as at 19 and an incandescent bulb 20 is threadedly engaged therein with the walls of the bulb base in electrical contact with the tubular plug 16 and the bulb terminal tip in electrical contact with one end of the conductive core 17.

The portion of the plug 16 extending below collar 15 is mounted in the neck 3 in threaded engagement with the internal surface thereof. The movable contact arm 9 is electrically connected to the other end of the core 17.

When the ring 5 is rotated clockwise, the lamp 20 is energized through the electrical circuit leading from the batteries 12 and 13, through the spring 10, the windings of the rheostat 7, the movable arm 9, the conductive core 17 to the terminal tip of bulb 20, and returning from the walls of the bulb base, through the tubular core 16, the walls of the housing 1, the closure means 6, and the spring 11 to the battery 13. Selective rotation of the ring 5 varies the light output of bulb 20 by means of the rheostat 7.

A cap member 21 is mounted on the upper portion of the plug 16 and contains the bulb 20. A retaining means 22, e.g. a screw, is suitably mounted through the wall of the cap and engages the plug 16, whereby the cap is securely fastened to the plug. The upper portion of the cap 21 is provided with an aperture 23 in which is mounted a focusing lens 24 for projecting the light from bulb 20. Another portion of the cap 21 is provided with a short boss or tubular extention 25 extending outwardly thereof in a direction opposite of the lens 24.

A ring member 26 having a magnifying lens 27 mounted therein and a short tab 28 extending laterally therefrom is mounted on the cap 21 by means of a screw 29, or the like, passing through the wall of the tab and in engagement with the boss or tubular extension 25. The ring 26 is positioned rearwardly and above the focusing lens 24 and relative to the cap 21 to permit a line of sight above the cap 21 through the lens 27.

A funnel member 30, e.g. a hollow cone-like speculum, is mounted on the arm 14' of collar 14. The funnel member comprises a rim or flange 31 at the mouth thereof or extending radially outwardly of the large opening or mouth thereof with a support arm 32 extending from the rim or flange in a direction rearwardly of the funnel. The arm 32 is connected to the arm 14' of ring 14 longitudinally thereof by a securing means 33 passing through the combined arms. The funnel member 30 is so mounted relative to the focusing lens 24 and magnifying lens 27 that a line of sight through the lens 27 and a beam of focused light passes in the direction of the mouth of the funnel through the funnel, and outwardly thereof through the smaller opening. Preferably, the mouth of the funnel is spaced about one to two inches from the focusing lens and the diverging light beam has a focal point about two to three inches from the focusing lens. Consequently, portions of the light beam impinge on the inner surface of the funnel or speculum over an area adjacent the smaller opening of the funnel and the light is funneled therethrough. The internal surface of the funnel is provided with a matte finish. Preferably, the inner surface of the funnel is a dull black surface to prevent or reduce the reflection of light therefrom.

A slender pick 34 is mounted on the funnel 30 and extends forwardly of the small funnel opening a distance of from about a fraction of an inch to several inches e.g. three inches. The elongated pick may be straight or curved and may be of circular, oval, square, rectangular or triangular cross-section and of a thickness, for example, ranging from about 1/32 inch to about 1/8 inch. Preferably, the pick has a matte surface, e.g. a dull black non-reflecting surface and also extends at least partly into the funnel through the small funnel opening. As illustrated by FIGURE 1, the pick extends completely through the funnel and one end thereof is secured to the outer rim of the funnel by a screw 35 securing the pick to the rim. Since the pick extends into the small funnel opening, the portion inside the funnel provides a sighting or aiming means resembling a gun sight and whereby a line of sight under illumination is easily directed at least along a portion of the length of the pick extending outwardly of the funnel.

FIGURE 3 illustrates a modification of the invention in that one end of a straight pick 36 is fixedly mounted on the inner surface of a thin ring 37, the thin ring being inserted into the smaller funnel opening and being either permanently or removably mounted therein. Alternatively, the ring 37 may be mounted over the smaller funnel opening with the pick fixedly mounted on the outer surface of the ring 37. Picks 34 and 36 can be substituted by picks of different dimensions depending on the intended application.

FIGURE 2 illustrates the application of the instrument of the invention. The pick 34 is inserted into the key way recess 38 of wafer-type lock 39 and engages at least one of the tumblers 40, 41, 42, 43, or 44, for the inspection thereof. The funneled light is directed along the length of the pick and there is a minimum of reflected light or extraneous light since the small funnel opening is positioned substantially near or against the lock key way recess and the funnel shields against reflected or extraneous light.

It is apparent that the light beam is fixedly directed along the extended pick and the light beam and pick are simultaneously manipulated, whereby the interior mechanism of the lock is under steady illumination while the pick is manipulated.

FIGURE 1 illustrates an auxiliary tubular ocular means 45, shown in detached position, threadedly engageable with the ring member 26 and containing a pair of lenses 46 and 47 spaced longitudinally of the ocular means or eye piece. The purpose of the auxiliary eye piece is to provide additional magnification should such be desirable. For example, while the lens 27 may provide a magnification of 2×, the use of the auxiliary eye piece may provide a magnification of 5×.

Various modifications of the invention are contemplated within the scope of the appended claim.

What is claimed is:

An inspection instrument for inspecting locks comprising a funnel-shaped member having a mouth at one end and a smaller opening at the other end, a rim defining the funnel mouth, a slender pick means fixedly mounted internally of the funnel at a location adjacent the smaller funnel opening, a portion of the pick means being positioned in the funnel and a portion thereof extending outwardly of the smaller funnel opening the portion of the pick means positioned in the funnel being a sighting means in line of sight with the portion extending outwardly of the funnel, and the internal surface of the funnel and the surfaces of the pick means having a dull finish, a source of light mounted on a support, means connecting the support to the funnel rim, the source of light being spaced from the funnel mouth and positioned to direct a beam of light through the funnel and outwardly of the smaller funnel opening.

References Cited in the file of this patent

UNITED STATES PATENTS

| | | |
|---|---|---|
| 1,345,406 | Rimmer | July 6, 1920 |
| 1,775,140 | Platou | Sept. 9, 1930 |
| 1,977,362 | Wakstein | Oct. 16, 1934 |
| 1,990,972 | Arnesian | Feb. 12, 1935 |
| 2,023,945 | Allyn | Dec. 10, 1935 |
| 2,343,041 | Arnesian | Feb. 29, 1944 |
| 2,678,645 | Raimo | May 18, 1954 |

FOREIGN PATENTS

| | | |
|---|---|---|
| 381 | Great Britain | Jan. 6, 1914 |